(12) United States Patent
Bhattacharyya (10) Patent No.: US 12,425,218 B2
(45) Date of Patent: Sep. 23, 2025

(54) PORTABLE IDENTITY VERIFICATION CONTEXT WITH AUTOMATIC RENEWAL OR VERIFICATION ORCHESTRATION TO MITIGATE DECAY

(71) Applicant: Capital One Services, LLC, McLean, VA (US)

(72) Inventor: Saurav Bhattacharyya, Brambleton, VA (US)

(73) Assignee: Capital One Services, LLC, McLean, VA (US)

( * ) Notice: Subject to any disclaimer, the term of this patent is extended or adjusted under 35 U.S.C. 154(b) by 238 days.

(21) Appl. No.: 18/344,435

(22) Filed: Jun. 29, 2023

(65) Prior Publication Data
US 2025/0007714 A1 Jan. 2, 2025

(51) Int. Cl.
*H04L 9/32* (2006.01)

(52) U.S. Cl.
CPC ................... *H04L 9/321* (2013.01)

(58) Field of Classification Search
CPC ..... H04L 9/321; H04L 9/3228; H04L 9/3231; G06F 21/31
See application file for complete search history.

(56) References Cited

U.S. PATENT DOCUMENTS 10,790,980 B2 * 9/2020 Camenisch ............... H04L 9/08
2022/0374412 A1 * 11/2022 Barnitt .................. G06F 16/215

OTHER PUBLICATIONS

Grassi, et al., "Digital Identity Guidelines," National Institute of Standards and Technology, U.S. Department of Commerce, Jun. 2017, 75 pages.

* cited by examiner

*Primary Examiner* — Huan V Doan
(74) *Attorney, Agent, or Firm* — Harrity & Harrity, LLP (57) ABSTRACT

In some implementations, a system may communicate with a user device to obtain verification information associated with a set of attributes related to a user identity. The system may generate a verification context associated with the identity of the user based on validating the verification information associated with the set of attributes, wherein the verification context includes personally identifiable information associated with the user and a verification status associated with each attribute related to the identity of the user. The system may send, to the user device, information to securely provision the verification context to a storage component of the user device. The system may communicate with the user device to update the verification information associated with one or more attributes based on the expiration information indicating that the one or more attributes have expired or will expire within a threshold time period.

20 Claims, 6 Drawing Sheets

PORTABLE IDENTITY VERIFICATION CONTEXT WITH AUTOMATIC RENEWAL OR VERIFICATION ORCHESTRATION TO MITIGATE DECAY

BACKGROUND

Identity verification is a security process that relies on the unique characteristics of individuals to verify that they are who they say they are. Identity verification systems compare received information or attributes to stored, confirmed, authentic information or attributes. If the received information or attributes match the stored information or attributes, an identity of the person submitting the information or attributes is verified or confirmed. Identity verification services are often used to manage access to physical and digital resources, such as buildings, rooms, and/or computing devices, among other examples. Additionally, or alternatively, identity verification services may be used to verify that a person is who they claim to be when opening a bank account, applying for a loan, or the like. Accordingly, identity verification services can be used in various circumstances to mitigate and/or detect data breaches, account takeover attacks, identity theft, and/or other fraudulent activity.

SUMMARY

Some implementations described herein relate to a system for generating and maintaining an identity verification context. The system may include one or more memories and one or more processors communicatively coupled to the one or more memories. The one or more processors may be configured to communicate with a user device to obtain verification information associated with a set of attributes that relate to an identity of a user operating the user device. The one or more processors may be configured to generate a verification context associated with the identity of the user based on validating the verification information associated with the set of attributes, wherein the verification context includes personally identifiable information associated with the user and a verification status associated with each attribute in the set of attributes that relate to the identity of the user, and wherein the verification status associated with each attribute in the set of attributes includes expiration information for the corresponding attribute. The one or more processors may be configured to send, to the user device, information to securely provision the verification context to a storage component of the user device. The one or more processors may be configured to communicate with the user device to update the verification information associated with one or more attributes in the set of attributes based on the expiration information associated with the one or more attributes indicating that the one or more attributes have expired or will expire within a threshold time period.

Some implementations described herein relate to a method for maintaining an identity verification context. The method may include communicating, by a user device, with a verification system to provide verification information associated with a set of attributes that relate to an identity of a user operating the user device. The method may include receiving, by the user device, a verification context associated with the identity of the user based on the verification system validating the verification information associated with the set of attributes, wherein the verification context includes personally identifiable information associated with the user and a verification status associated with each attribute in the set of attributes that relate to the identity of the user, and wherein the verification status associated with each attribute in the set of attributes includes expiration information for the corresponding attribute. The method may include communicating, by the user device, with the verification system to update the verification information associated with one or more attributes in the set of attributes based on the expiration information associated with the one or more attributes indicating that the one or more attributes have expired or will expire within a threshold time period.

Some implementations described herein relate to a non-transitory computer-readable medium that stores a set of instructions. The set of instructions, when executed by one or more processors of a verification system, may cause the verification system to communicate with a user device to obtain verification information associated with a set of attributes that relate to an identity of a user operating the user device. The set of instructions, when executed by one or more processors of the verification system, may cause the verification system to generate a verification context associated with the identity of the user based on validating the verification information associated with the set of attributes, wherein the verification context includes personally identifiable information associated with the user and a verification status associated with each attribute in the set of attributes that relate to the identity of the user, and wherein the verification status associated with each attribute in the set of attributes includes expiration information for the corresponding attribute. The set of instructions, when executed by one or more processors of the verification system, may cause the verification system to send, to the user device, information to securely provision the verification context to a storage component of the user device. The set of instructions, when executed by one or more processors of the verification system, may cause the verification system to communicate with the user device to update the verification information associated with one or more attributes in the set of attributes based on the expiration information associated with the one or more attributes indicating that the one or more attributes have expired or will expire within a threshold time period.

DETAILED DESCRIPTION

The following detailed description of example implementations refers to the accompanying drawings. The same reference numbers in different drawings may identify the same or similar elements.

Digital identity is the unique representation of a subject engaged in an online transaction. A digital identity is always unique in the context of a digital service, but does not necessarily uniquely identify the subject in all contexts. In other words, accessing a digital service may not mean that the real-life identity of the subject is known. Identity proofing establishes that a subject is who the subject claims to be. Digital authentication is the process of determining the validity of one or more authenticators used to claim a digital identity. Authentication establishes that a subject attempting to access a digital service is in control of the technologies used to authenticate. Successful authentication provides reasonable risk-based assurances that the subject accessing the service today is the same person that previously accessed the service. Digital identity presents various challenges, however, because the identity verification process often involves proofing individuals over an open network, and typically involves the authentication of individual subjects over an open network. Accordingly, there are multiple opportunities for impersonation and other attacks in which one person fraudulently claims (or attempts to claim) the digital identity of another person.

Furthermore, each time that an authorized user accesses a service that relies upon a verified digital identity, the authorized user may be required to perform the same verification steps (e.g., providing information, such as a name, date of birth, and/or scanned biometric data) in order to gain permission to access the service. In other words, even in cases where a verification context is associated with the same account or the same user, separate verification registrations or verification services may be required in order to enable identity verification via different platforms, services, or devices. Furthermore, the attributes that form a verification context (e.g., personally identifiable information matched or otherwise associated with a physical identity document, device possession, biometric footprint, or the like) may be susceptible to decay over time. For example, each attribute may be associated with an expiration, a validity period, and/or a time-to-live, and the associated user may be required to reauthenticate or reestablish the attributes after expiration. This may consume significant processing resources, memory resources, and/or network resources associated with performing multiple registration procedures and/or with storing multiple verification contexts associated with the same user, among other examples, for enabling verification via multiple platforms, services, and/or devices.

Additionally, identity verification services may be performed at a service layer. From a protocol stack perspective, service layers are typically layered on top of existing network protocol stacks and provide value added services to client applications as well as other services. For example, service layers may be referred to as "middleware" service layers. For example, a service layer may be an abstraction over domain logic. The service layer may define an application's boundary with a layer of services that establishes a set of available operations and coordinates the response associated with each operation. For example, applications typically require different kinds of interfaces to the data stored by the application and logic (e.g., business logic) implemented by the applications. Despite their different purposes, these interfaces often need common interactions with the application to access and manipulate data and invoke the business logic. Encoding the business logic of the interactions separately in each module (e.g., for each interface) may consume processing resources and/or memory resources associated with duplication of encoding the logic. The service layer may be used to centralize the business logic inside a single layer associated with all of the interfaces associated with the application. Therefore, due to the centralized nature of the service layer, identity verification services for an application or service are typically performed within the service layer.

However, because the service layer may be accessed (e.g., via an application programming interface (API) or other interfaces associated with an application or service) via a communication that is transmitted over a network (e.g., wireless network or a wired network), performing full verification procedures or services at the service layer may consume network resources and/or processing resources, among other examples associated with the communications over the network. Additionally, malicious actors may initiate attacks on the service or application. The attacks may include duplicating or emulating multiple devices and sending separate access requests or calls to the services from the duplicated or emulated devices. Because the request or calls may be allowed to pass to the service layer before verification is performed, significant network resources and/or bandwidth may be consumed before the application or service is enabled to identify that the request or calls are associated with an attack by a malicious actor. For example, even if the verification services performed at the service layer are able to identify the requests or calls as malicious, network resources, bandwidth, and/or processing resources may be consumed (or exhausted in some cases) associated with the attack.

Some techniques and implementations described herein enable a portable verification context that be associated with a unique identifier, which may enable the portable verification context to be obtained prior to a request or call being passed to the service layer of an application or service. For example, a call (e.g., an API call) associated with a service may include an identifier, and a verification system may obtain a verification context (e.g., from a database associated with the service layer). The verification system (e.g., before passing or providing the call to the service layer) may compare the identifier indicated in the call to the unique identifier associated with the verification context. If the identifier and the unique identifier match, then the verification system may enable the call to proceed with a verification service procedure and/or may verify or authenticate the call (e.g., may pass the call to the service layer for additional processing and/or actions). If the identifier and the unique identifier do not match, then the verification system may reject the call and may refrain from passing the call to the service layer.

In some implementations, the unique identifier may be an identifier of a user device associated with the verification context. For example, the user device may be associated with registering the verification context (e.g., with the verification system). In other words, the verification context may be expanded to include information specific to a given user device. In this way, each time an authorized user attempts to access the application or service via the verification system, the authorized user may be verified based at least in part on the verification system comparing the identifier of the user device associated with the access attempt to a device identifier associated with the verification context (e.g., without passing an API call to the service layer). This may conserve network resources, processing resources, and/or other computing resources that would have otherwise been used by passing an API call to the service layer and performing a full verification procedure at the service layer.

Furthermore, to mitigate or prevent decay of the attributes forming the verification context, each attribute may be associated with an expiration status, which may define a validity period for the corresponding attribute. For example, if the verification context includes attributes that relate to a verified identity document (e.g., a driver's license or passport), possession of a user device, a biometric footprint, a phone number, a photograph, or the like, each attribute may be associated with respective expiration information that indicates when the attribute needs to be verified again. Accordingly, when a particular attribute has expired or will expire within a threshold time period, the verification system may route the user device to an appropriate verification engine associated with an identity verification service or platform to automatically renew the corresponding attribute. Additionally, or alternatively, each attribute forming the verification context may be associated with a relative weight, and the identity of a user may be verified or not verified depending on which attributes are considered valid at the time of an identity verification request. For example, a given service or application may specify that an identity is verified when the currently valid attributes have a cumulative weight that satisfies a threshold, or may specify that a certain attribute or certain attributes need to be valid in order to verify an identity. Accordingly, when an identity verification is requested, the verification system may determine which attributes are currently valid and/or whether a suitable combination of valid attributes can be relied upon to indicate that an identity of the requester is verified. In cases where the verification system determines that one or more attributes that are needed to verify the identity of the requester are expired or otherwise invalid, the verification system may invoke the appropriate verification engine to orchestrate the corresponding verification methods.

Moreover, techniques and implementations described herein enable at least part of the verification service or procedure to be performed outside of the service layer of an application or service. For example, a verification service may include multiple steps. A first step, of the multiple steps, may be comparing an identifier provided in an API call to the unique identifier associated with the verification context (e.g., prior to passing information or the API call to the service layer). If the identifier provided in the API call does not match the unique identifier associated with the verification context, then the verification system may deny an access attempt and refrain from passing information or the API call to the service layer. If the identifier provided in the API call matches the unique identifier associated with the verification context, then the verification system may proceed with the verification service and/or may pass information or the API call to the service layer. In this way, at least a first step in the verification service is outside the service layer. In this way, if a malicious actor were to transmit a fraudulent request or call to access the service, the fraudulent request or call may be rejected prior to the fraudulent request or call being passed to the service layer. This may conserve network resources, network bandwidth, memory resources, and/or processing resources that would have otherwise been used providing information associated with the fraudulent request or call to the service layer, performing a full verification of the fraudulent request or call at the service layer, and rejecting the fraudulent request or call at the service layer, among other examples.

Figure 1A:
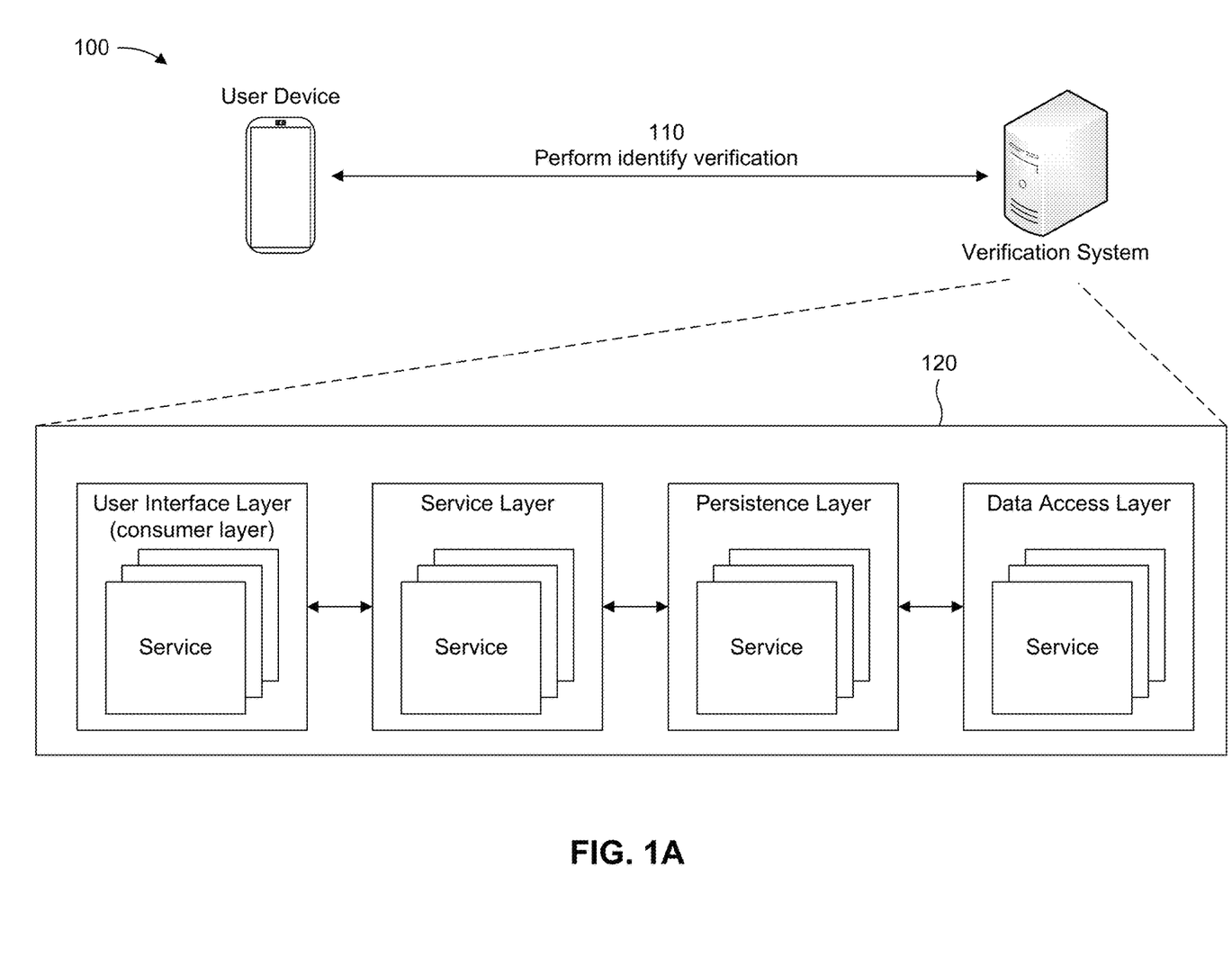
FIGS. 1A-1C are diagrams of an example implementation associated with a portable identity verification context with automatic renewal or verification orchestration to mitigate decay, in accordance with some embodiments of the present disclosure.
Figure 1B:
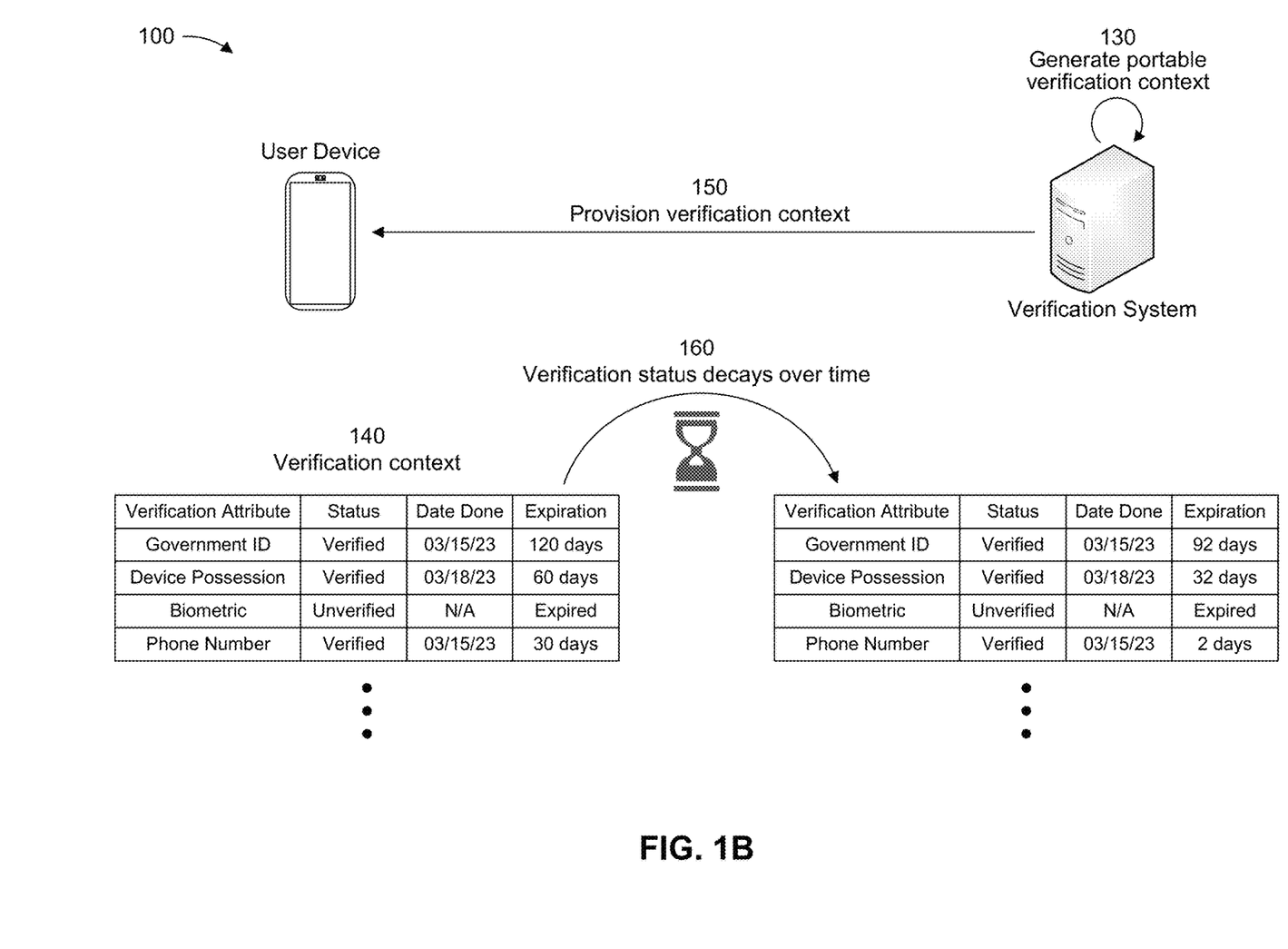
Figure 1C:
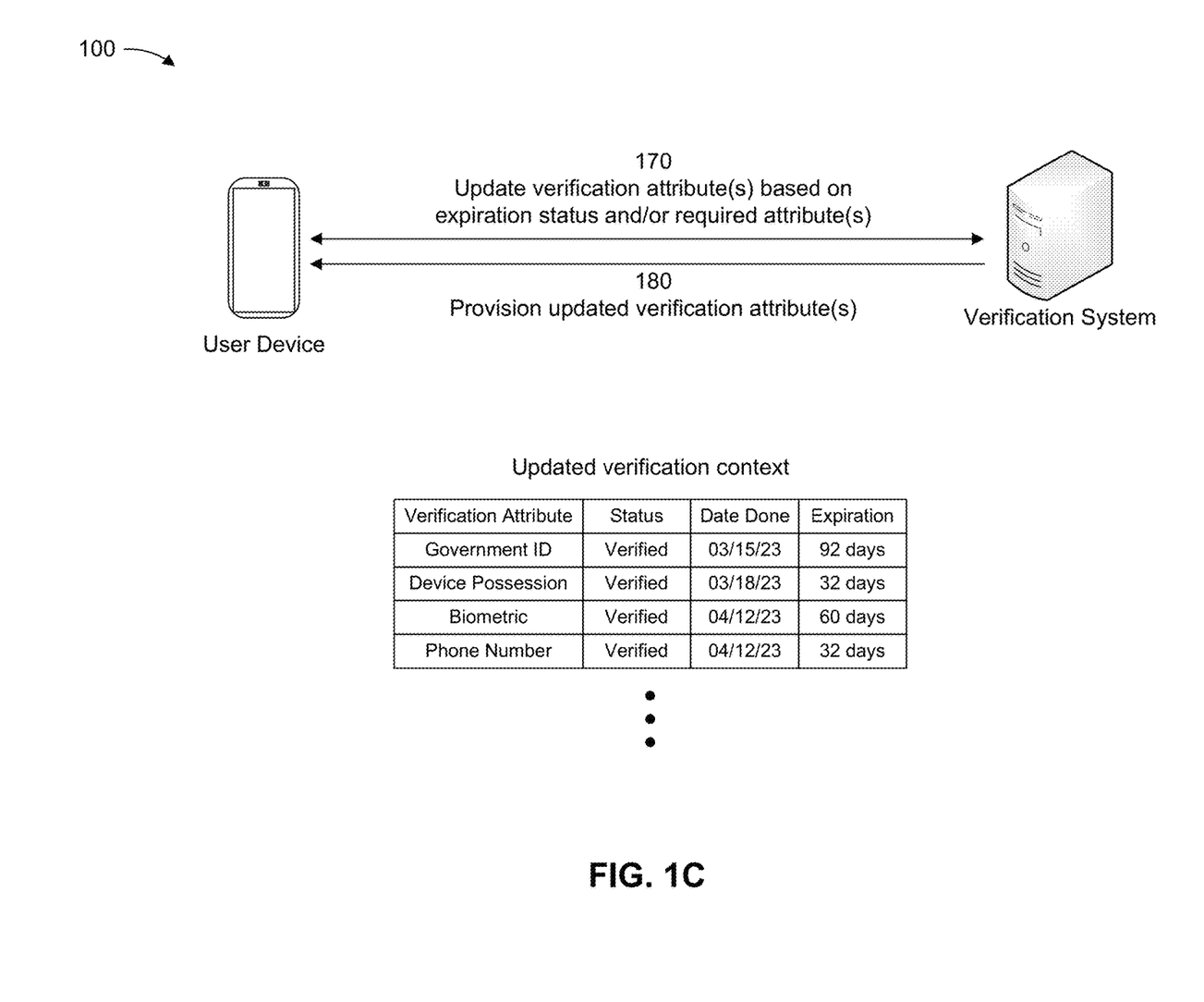

FIGS. 1A-1C are diagrams of an example 100 associated with a portable identity verification context with automatic renewal or verification orchestration to mitigate decay. As shown in FIGS. 1A-1C, example 100 includes a verification system and a user device. The verification system and the user device are described in more detail below in connection with FIG. 2 and FIG. 3.

As shown in FIG. 1A, and by reference number 110, the user device and the verification system may communicate with one another to perform an identity verification procedure in which the verification system obtains verification information associated with a set of attributes that relate to an identity of a user operating the user device. For example, in some implementations, the identity verification procedure may initially be performed in connection with a registration procedure associated with a user account (e.g., to open a bank account, apply for a loan or a credit card, open a social media account, or otherwise establish an account that is associated with a verified user identity). In some implementations, the identity verification procedure may be performed via a first platform or service that is associated with a host. For example, as used herein, a "host" may refer to a network host, an internet host, or an internet protocol (IP) host, among other examples. For example, the host may be a server, computer, or another device connected to a computer network. The host may work as a server offering information resources, services, and applications to devices or other hosts on the network. In some implementations, the verification system may be the host or may be a device associated with the host. As used herein, a "platform" or "service" may refer to a computing platform or a digital platform. A platform or service is a discrete unit of functionality that can be accessed remotely and acted upon and updated independently, such as retrieving a credit card statement online, among other examples. For example, a platform or service may be an environment in which software is executed (e.g., the hardware and/or software on which a software application may be executed). For example, a platform may include hardware and/or software associated with a device, such as the user device. For example, a platform may be associated with an application executing on the user device (e.g., a mobile application or a native application), an operating system of the user device, a web browser, an API, and/or other program code. In some implementations, a platform may include hardware alone (e.g., an embedded system), a browser (e.g., a web browser), an application, a software framework, a cloud computing service, and/or a virtual machine, among other examples.

As shown by reference number 120, the verification system may support a service or platform associated with various layers. For example, in some implementations, the various layers may be associated with a service-oriented architecture (SOA). For example, an interface or a communication protocol may be defined between different layers of a computer program intended to simplify the implementation and maintenance of software. The communication protocol stack may be associated with passing or providing information or commands between layers. For example, as shown in FIG. 1A, information or commands for an application, service, or platform may be passed from left to right between the layers. For example, the different layers may include a user interface layer, a service layer, a persistence layer, and/or a data access layer. In some implementations, the layers may include more layers, fewer layers, and/or differently arranged layers than those depicted in FIGS. 1A-1C. The user interface layer may also be referred to as a consumer layer, an enterprise layer, a business process layer, or a web layer. The service layer may also be referred to as a logic layer or a business logic layer.

With reference to a communication protocol stack, the user interface layer may reside above the service layer. The user interface layer may be associated with a front end of the service or platform. The user interface layer may contain the actual graphical user interface (GUI) modules and/or elements that can be interacted with by users. The user interface layer may be associated with high level embedding APIs to support integration with a web browser or mobile application, among other examples. The user interface layer may be the point at which users interact with the service or platform. For example, the user interface layer may be associated with the runtime and deployment infrastructure, programs, platforms, application servers, containers, runtime environments, packaged applications, virtual machines, among other examples, that are needed to support the service or platform.

The service layer may be located between the user interface layer and the persistence layer. The service layer may be a "middle" layer where services (both individual and composite services) that carry out business functions reside. The service layer may act as a bridge between the lower-level layers (e.g., the persistence layer and/or the data access layer) and the higher-level layers (e.g., the user interface layer). For example, the service layer may include business logic that is applied commonly for various services of the higher-level layers (e.g., the user interface layer). The service layer may support functional capabilities (e.g., services) that enable business capabilities, capabilities to enable the runtime execution of the service and the support of service virtualization, and/or policy document management, among other examples. In other words, the service may support services and/or capabilities that are associated with supporting other operations or services of a platform or application. For example, the user interface layer may use one or more to display data (e.g., on a user device), or to invoke a business process. The service layer provides data required by the user interface layer. The service layer may exist because more than just fetching and updating data is required by an application or platform (e.g., there is also additional business logic that is independent of the user interface layer).

The persistence layer may manage interactions with data associated with a user or an account (e.g., with the data access layer). For example, the persistence layer may facilitate a single, consistent, unified view of data. For example, the persistence layer may support a service associated with creating a centralized view of master data (e.g., that is stored in different, distributed databases) as if the master data were in a single database. For example, the persistence layer may map structured objects (e.g., provided by the service layer) to persistence implementation to perform the data retrieval or updates. The persistence layer may accept structured data objects (SDOs) (e.g., from the service layer) that are transformed (e.g., mediated) into objects, such as physical SDOs. Physical SDOs may be stored in the data access layer.

The data access layer may be associated with access and/or storing data associated with a user and/or an account. The data access layer may also be referred to as a data layer. The data access layer may include one or more databases (e.g., a single database or multiple distributed databases). The data access layer may be used by other layers or services to access and manipulate data within one or more databases.

As described elsewhere herein, verification or authentication information may be stored and/or performed in the service layer of an application, service, or platform. "Verification" and "authentication" may be used interchangeably herein. In some implementations, during the identity verification procedure, the verification system may obtain, from the user device, verification information associated with an account based on performing a registration procedure associated with a service, application, or platform. The registration procedure may be associated with registering an account with the service, application, or platform. For example, the verification information may include a set of attributes that relate to an identity of the user operating the user device, such as personally identifiable information associated with the user (e.g., a name, address, date of birth, driver's license number, and/or social security number, among other examples), one or more identification documents (e.g., passport and/or driver's license) associated with the user, biometric information associated with the user (e.g., fingerprint scan, face scan, retina scan, and/or iris scan), and/or information that proves or otherwise verifies that the user is in possession of the user device (e.g., a telephone number, email address, and/or other information that can be used to prove device possession, such as by sending a one-time code to the telephone number of the user device or an email to the email address that is accessed via the user device), among other examples. For example, the verification information may include any information that can be used to verify that a user is who the user claims to be. The verification information may be passed from the user interface layer to the service layer.

As shown in FIG. 1B, and by reference number 130, the verification system may generate a verification context associated with the identity of the user based on validation of the verification information related to the identity of the user operating the user device. In some implementations, the verification context may be a portable object (e.g., a data object or data block) that is used to verify access attempts to the service. The verification context may be an extensible markup language (XML) object. For example, the verification system may compile the verification information and store the verification information in a data object or a data block that is associated with the user of the user device. In some implementations, the verification context may be an object with a set of fields. Each field, of the set of fields, may be associated with one or more of the attributes (e.g., the verification information) that relate to the identity of the user and/or can be used to verify that the user of the user device is who the user claims to be. For example, the set of fields may include one or more fields associated with personally identifiable information that may be linked or otherwise associated with other information related to the identity of the user of the user device. For example, the one or more fields may include an account identifier, a name, an address, a phone number, a date of birth, an image of a user, an image of an identification card or identity document (e.g., an image of a driver's license or passport), biometric data, and/or device possession data, among other examples. In some implementations, the verification context may include one or more security questions and corresponding responses. In some implementations, the verification context may be automatically updated or renewed to mitigate or prevent decay of the set of attributes that form the verification context.

For example, as shown by reference number 140, each attribute included in the verification context may be associated with expiration information that indicates when the corresponding attribute will expire or otherwise need to be reauthenticated. Furthermore, the verification context may include information that indicates whether various attributes related to the identity of the user of the user device have been verified or are unverified. Accordingly, as described herein, the verification system may generate and manage various verification contexts that each relate to the identity of a single person and a set of attributes that can be relied upon to verify that the person is who the person claims to be. For example, in some implementations, the attributes can include a first and last name, a date of birth, a driver's license, telephone number, and/or other attributes, and the verification system may interface with one or more verification routers that can communicate with a suitable service provider to verify each of the attributes. For example, to verify that the user of the user device is in possession of a device associated with a specific telephone number, the verification system may communicate with a mobile network operator or other telephone service provider to validate that it is indeed true that the user of the user device is associated with that telephone number. In another example, the verification system may communicate with a security token service or other system associated with an entity that issues driver's licenses or passports based on the user of the user device submitting one or more identity documents as the verification information. Furthermore, each time that the verification process is performed for a particular attribute, the verified attribute is added to the verification context and associated with a field or other information that indicates how long the attribute is considered verified (e.g., a given number of days, weeks, months, or the like). For example, FIG. 1B illustrates a verification context in which the user of the user device has submitted verification information related to a government ID, a device that the user possesses, and a telephone number, each of which are associated with corresponding expiration information that indicates when the verified attribute will expire. Furthermore, in the example verification context shown in FIG. 1B, the user has not submitted any biometric data, which is therefore marked as unverified and/or expired, Accordingly, in some implementations described herein, the verification system may be configured to automatically update or renew the verification information associated with one or more attributes that have been expired or will expire within a threshold time period (e.g., independent of and/or in connection with an authentication request that relies upon the verification context associated with the user).

As shown in FIG. 1B, and by reference number 150, the verification system may provision the verification context to the user device. For example, in some implementations, the verification system may encrypt the verification context with a unique identifier, which may enable the unique identifier to be used to access and/or authenticate an access attempt associated with the verification context (e.g., if a request to access the service or platform indicates the unique identifier, then the verification system may determine that the request is verified or authentic). In some implementations, the unique identifier may be generated by the verification system. For example, the unique identifier may be randomly generated by the verification system. In some implementations, the unique identifier may be a public key in a public-private key pair. For example, the verification context may be encrypted using the public-private key pair. The public key may be provided as part of a request (e.g., a service call or an API call) to facilitate verification of the request. In some implementations, the unique identifier may be an identifier of the user device associated with the verification context. For example, the verification context may include the identifier of the user device. In other words, a bound of the verification context may be expanded to include a specific user device. In this way, the identifier of the user device may be used to authenticate or verify an access attempt (e.g., by comparing a device identifier of a user device associated with the access attempt to the identifier associated with the verification context). For example, the verification context may include the unique identifier, a name of a user associated with the account, personally identifiable information of the user, one or more identification documents associated with the user, and/or biometric information of the user, among other examples. In some implementations, the verification system may store the verification context in connection with the unique identifier. For example, the verification system may store the verification in a data structure such that the unique identifier is mapped to the verification context in the data structure. In some implementations, the verification context may be stored in the service layer. In some other implementations, the verification context may be stored in the data access layer.

In some implementations, the verification system may provide, to the user device, an indication of the unique identifier to securely provision the verification context to a storage component of the user device. For example, in cases where the unique identifier is generated by the verification system, the verification system may provide an indication of the unique identifier to the user device, which may enable the user device to provide an indication of the unique identifier in future calls or requests to access data associated with the service or platform. For example, the unique identifier may be a public key, as described elsewhere herein. The verification system may provide an indication of the public key to the user device, and the user device may store an indication of the unique identifier that is associated with the verification context in the storage component of the user device. Accordingly, the information related to the verification context may be securely provisioned to the user device for portability, such that the information related to the verification context can be relied upon in one or more access attempts.

For example, in some implementations, a user device (e.g., the user device or a different user device) may attempt to access data associated with the service or platform. For example, a user may interact with a user interface (e.g., provided by or supported by the user interface layer) to request access to the data (e.g., that is stored in the data access layer) associated with the service or platform. For example, the user may provide a login request to an account via the user interface. In some implementations, the user device may provide (e.g., send), and the server device may obtain (e.g., receive), a request to access the service. The request may be a service call (e.g., an API call to access the service). The request may be associated with the account (e.g., the account that is associated with the identity verification procedure described elsewhere herein). For example, the request may indicate an identifier of the account, an account number, and/or a username associated with the account (e.g., an email address or another username).

In some implementations, the request may indicate an identifier associated with the request (e.g., a service call identifier associated with the service call). In some implementations, the identifier may be a device identifier of the user device. In some implementations, the identifier may be another unique identifier (e.g., other than a device identifier). For example, the identifier may be a public key or other cryptographic key. As described elsewhere herein, the identifier indicated in the request or service call may be associated with a portable verification context (e.g., portable in that the verification context may be applied to requests or calls from different devices, different sessions, and/or different interfaces). For example, in some implementations, the request or service call may be obtained by the verification system from a third party device that differs from the user device that was used to perform the identity verification procedure. As another example, the identity verification procedure may be associated with a first session with the service or platform. The service call or request may be associated with a second, subsequent session (e.g., a later session) with the service or platform.

In some implementations, the service call or request may indicate information (e.g., user information) associated with the account. For example, the service call or request may include information provided by a user for the purpose of verifying the service call or request. For example, the user information may include a name (e.g., a first name and last name), an image (e.g., an image of the user, an image of an identification card or document, or another image), biometric scan data, and/or a telephone number or other data related to device possession, among other examples. For example, the user device may obtain the user information via user input or a component of the user device, such as a camera or biometric scanner. In some implementations, the user device may determine an identifier to be associated with the service call or the request. For example, the user device may determine that the device identifier of the user device is to be provided with the service call or the request to facilitate verifying the service call or request. As another example, the user device may determine that the identifier provided to the user device by the server device (e.g., the unique identifier generated by the server device as described in more detail elsewhere herein) is to be provided with the service call or the request to facilitate verifying the service call or request.

In some implementations, when the verification system receives a service call or a request, the verification system may verify an account associated with the service call or request based on information provided with the service call or request. For example, the verification system may perform a verification service associated with the request prior to passing the request to the service layer associated with the service or platform. In some implementations, the verification service includes verifying the request or service call based on whether the identifier (e.g., provided in the request or service call) matches the unique identifier associated with the verification context. For example, the verification system may receive or retrieve the verification context from a storage location based on obtaining the request or service call. For example, the verification system may query a layer using the user information and/or the identifier indicated by the request or service call to obtain the verification context. For example, the verification system may obtain the verification context from the service layer, or the verification context may be stored and/or received from outside of the service layer (e.g., such that no information needs to be provided to the service layer to perform the verification service).

In some implementations, the verification service may verify the service call or request based on a comparison of the identifier associated with the service call and the unique identifier associated with the verification context. For example, the verification system may search or query for a verification context that is associated with the identifier. If a verification context is identified (e.g., based on the search or query), then the verification system may determine that the identifier provided by the service call or request matches the unique identifier associated with the verification context. If no verification context is identified (e.g., based on the search or query), then the verification system may determine that the identifier provided by the service call or request does not match a unique identifier associated with the verification context (e.g., and the server device may deny access to the service or platform for the service call, as described in more detail below). As another example, the verification system may identify the verification context based on user information provided in the service call or request. For example, the verification system may search or query for a verification context associated with an account identifier, a name, and/or other user information indicated by the service call. The verification system may identify the unique identifier associated with the obtained verification context. The verification system may compare the unique identifier to the identifier indicated by the service call. If the identifier and the unique identifier match (e.g., are the same), then the verification system may proceed with the verification service. If the identifier and the unique identifier do not match (e.g., are not the same), then the verification system may deny access to the service or platform for the service call.

As another example, the verification system may attempt to decrypt the verification context using the identifier provided by the service call or request. For example, the identifier may be a public key. The verification system may use the public key to attempt to decrypt the verification context. If the verification system successfully decrypts the verification context using the identifier, then the verification system may determine that the identifier provided by the service call or request matches the unique identifier associated with the verification context. If the verification system is unable to successfully decrypt the verification context using the identifier, then the verification system may determine that the identifier provided by the service call or request does not match a unique identifier associated with the verification context and may deny access to the service or platform for the service call.

For example, the verification system may proceed with the verification service if the identifier provided in the service call or the request matches the unique identifier associated with the verification context. In some implementations, if the identifier provided in the service call or the request matches the unique identifier associated with the verification context, then the verification system may determine that the service call or request is verified. In other words, if the identifier provided in the service call or the request matches the unique identifier associated with the verification context, then the verification system may not perform additional verification procedures. For example, if the identifier provided in the service call or the request matches the unique identifier associated with the verification context, this may indicate that the service call or request is originating at a device that has been previously used to access the service or platform by an authorized user (e.g., because the user device has access to the unique identifier established or generated during the registration procedure). Therefore, the verification system may not perform additional verification procedures and may pass or transmit information associated with the service call or request to the service layer for additional processing.

In other implementations, if the identifier provided in the service call or the request matches the unique identifier associated with the verification context, then the verification system may perform additional verification procedures to verify the service call or request (e.g., the verification system may only perform the additional verification procedures if identifier provided in the service call or the request matches the unique identifier associated with the verification context, then the verification system may not perform additional verification procedures). For example, in some implementations, the verification system may compare the information indicated by the service call and the verification information associated with the verification context based on determining that the identifier associated with the service call matches the unique identifier. For example, the verification system may determine whether user information indicated by the service call or request sufficiently matches verification information associated with the verification context. In some examples, depending on the context, "sufficiently match" may refer to an actual match or may refer to a quantity of data points that match between the verification information and the user information satisfying a threshold. For example, if the user information is a name, then the name may sufficiently match the verification information if the name provided in the service call is the same as a name stored in connection with the verification context. As another example, if the user information is scanned biometric information, then the verification system may determine whether the scanned biometric information or data sufficiently matches the stored biometric information data (e.g., if a quantity of minutiae points between the scanned biometric data and the stored biometric data that are the same satisfy a threshold). As another example, the verification system may input user information indicated by the service call to a model (e.g., an image recognition model or an image analysis model). The verification system may determine that there is a sufficient match if the model outputs an indication that there is a match.

In some implementations, the verification system may enable information to be passed to the service layer if verification is successful. For example, if the verification system determines that the identifier indicated by the service call matches the unique identifier associated with the verification context and/or determines that user information indicated by the service call or request sufficiently matches verification information associated with the verification context, then the verification system may pass or transmit information associated with the service call to the service layer for additional or further processing. If the verification system determines that the identifier indicated by the service call does not match the unique identifier associated with the verification context and/or determines that the user information indicated by the service call or request does not sufficiently match the verification information associated with the verification context, then the verification system may refrain from passing or transmitting information associated with the service call to the service layer. This may conserve network resources, processing resources, and/or computing resources that would have otherwise been using passing or transmitting information to the service layer for a service call that would ultimately be unverified and not permitted to access data (e.g., from the data access layer).

Additionally, by associating or bounding the verification context to the unique identifier, the verification service may be performed without performing another registration procedure with a different user device based on the different user device indicating the identifier in the service call. For example, a full registration procedure may not need to be performed when a user accesses the service or platform via different user devices so long as the different user devices have access to the unique identifier. As a result, the verification context may be portable across different user devices and across different sessions associated with the user. This may conserve time, network resources, memory resources, and/or processing resources that would have otherwise been used to perform a full registration procedure on each user device (e.g., for storing a verification context for the same user and/or the same account).

In some implementations, the verification system may selectively grant access to the service layer for the service call based on whether the identifier associated with the service call matches the unique identifier. For example, the verification system may enable the user device may access data associated with the service or platform (e.g., stored by the data access layer) based on whether the identifier associated with the service call matches the unique identifier and/or on successfully verifying the user information. For example, the verification system may enable the service layer, the persistence layer, the data access layer, and/or other layers associated with the service or platform to process the service call or request based on successfully verifying that the service call or request indicates the unique identifier associated with the verification context. In some implementations, this may indicate that the user device associated with the service call or request is the same device that was associated with the identity verification procedure (e.g., where the unique identifier is the device identifier of the user device used to perform the identity verification procedure). In other examples, this may indicate that the user device associated with the service call or request is associated with an authorized user (e.g., because the user device was enabled to previously obtain the unique identifier).

For example, the verification system may grant access to the service layer for the service call if the identifier associated with the service call matches the unique identifier and/or if the information indicated by the service call sufficiently matches the verification information. This may enable the service layer to process the service call, may enable the persistence layer to query a database associated with the data access layer, and/or may enable the data access layer to obtain data to be provided to the user device. For example, the verification system may provide the data to the user device based on the identifier associated with the service call matching the unique identifier and/or the information indicated by the service call sufficiently matching the verification information. Alternatively, the verification system may deny access to the service layer for the service call if the identifier associated with the service call does not match the unique identifier or if the information indicated by the service call does not sufficiently match the verification information. For example, the verification system may not allow information to be passed or provided to the service layer based on the identifier associated with the service call not matching the unique identifier or the information indicated by the service call not sufficiently matching the verification information.

Furthermore, in some implementations, whether the verification system grants access to the service layer may depend on the expiration status associated with the set of attributes that form the verification context. For example, as described above, each attribute in the verification context is associated with one or more verification attributes, such as a government ID or other identity document attribute, a device possession attribute, a biometric attribute, and/or a telephone number attribute, among other examples. Accordingly, depending on the service associated with the service call, a third party relying upon the verified identity attributes may indicate that one or more attributes need to be verified by the verification context in order to proceed with the service call. In general, the one or more attributes (or combination of attributes) that are needed to verify the identity of the user of the user device may depend on a risk profile associated with the service cell. For example, a request to open or access a bank account or a loan or credit card may require verified identity attributes related to an identity document and any second attribute, and requests to access a social media account or other account may require a biometric attribute or other suitable attributes. Accordingly, in some implementations, the verification system may be configured to automatically initiate a process to renew or update one or more verification attributes that have expired or will expire within a threshold time period. For example, as shown by reference number 160 in FIG. 1B, the various attributes that form the verification context are each associated with expiration information, whereby the verification status associated with each verification attribute decays over time (e.g., expires or approaches expiration based on the expiration information).

Accordingly, as shown in FIG. 1C, and by reference number 170, the verification system may communicate with the user device to update one or more verification attributes based on the expiration status and/or one or more required attributes associated with a service call or request. For example, in some implementations, the verification system may communicate with the user device to update one or more attributes that have expired and/or one or more attributes that will expire within a threshold time period. In this way, the user device may reauthenticate the one or more verification attributes that have expired or will expire within the threshold time period, and the verification system may route the user device to the appropriate external verification system to verify the validity of the verification information supporting the updated verification attributes. For example, the verification system may facilitate communication between the user device and an agency that issues driver's licenses or passports to revalidate a government ID attribute, may request that the user use one or more input devices to provide updated biometric data, and/or may communicate with a mobile network operator to verify that the user is in possession of a device linked to a telephone number attribute, among other examples. In some implementations, the verification system may communicate with the user device to update the verification attributes when the user device provides a service call or request that relies upon the verification context, based on a determination that one or more of the verification attributes have expired or will expire within a threshold time period. Additionally, or alternatively, the verification system may communicate with the user device to update the verification attributes when the verification system receives a request from a third party device that is relying on the verification context. For example, an entity that is evaluating whether to open a bank account or approve a loan may submit a request to the verification system to validate the identity of the user operating the user device. In such cases, after updating the verification attributes, the verification system may send information that relates to the updated verification attributes to the third party device.

Furthermore, in some implementations, each attribute in the verification context may be associated with a relative weight based on the expiration information associated with the attribute. For example, a verified identity document may have a highest weight (e.g., based on a difficulty associated with fraudulently spoofing an identity document), and other attributes such as device possession may have a lower weight (e.g., because a fraudulent or malicious user may gain unauthorized access to a device belonging to someone else). Accordingly, as time elapses and the expiration information for one or more attributes indicate that the corresponding attributes have expired or are about to expire, the verification system may reevaluate and update the relative weight assigned to each verification attribute. For example, if a government ID attribute has expired, the relative weight assigned to other verification attributes that have a high reliability may be increased. In this way, when a service call or request to verify the identity of the user operating the user device is received, the verification system may provide an indication of whether the identity of the user can be verified based on the relative weights assigned to the verification attributes that have not expired or are otherwise within a validity period. For example, the verification system may be configured to reevaluate and update relative weights assigned to biometric attributes and/or a telephone number in cases where the government ID attribute has expired such that biometric attributes and/or a telephone number can be relied upon to verify the identity of the user when the government ID attribute has expired. Additionally, or alternatively, in cases where the government ID attribute has expired and the user has not previously verified their biometric attributes and/or telephone number (or their biometric attributes and/or telephone number have expired), the verification system may orchestrate the services to complete the identity verification methods needed to verify the identity of the user. Furthermore, as shown by reference number 180, the verification system may update the verification context based on the updated identity verification methods and provision the updated verification context to the user device in a similar manner as described elsewhere herein.

As indicated above, FIGS. 1A-1C are provided as an example. Other examples may differ from what is described with regard to FIGS. 1A-1C.

Figure 2:
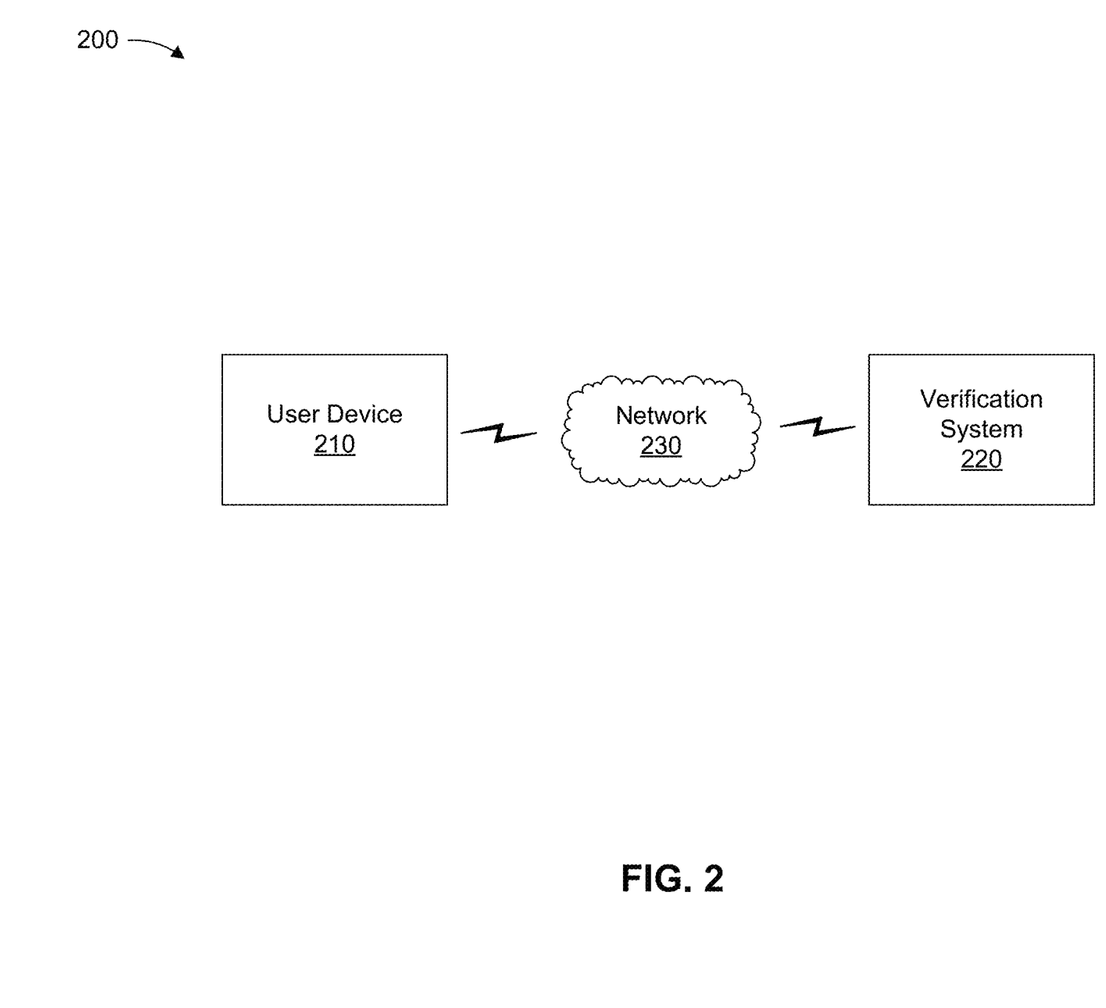
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, a verification system 220, and a network 230. Devices of environment 200 may interconnect via wired connections, wireless connections, or a combination of wired and wireless connections.

The user device 210 may include one or more devices capable of receiving, generating, storing, processing, and/or providing information associated with a portable identity verification context with automatic renewal or verification orchestration to mitigate decay, as described elsewhere herein. The user device 210 may include a communication device and/or a computing device. For example, the user device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The verification system 220 may include one or more devices capable of receiving, generating, storing, processing, providing, and/or routing information associated with a portable identity verification context with automatic renewal or verification orchestration to mitigate decay, as described elsewhere herein. The verification system 220 may include a communication device and/or a computing device. For example, the verification system 220 may include a server, such as an application server, a client server, a web server, a database server, a host server, a proxy server, a virtual server (e.g., executing on computing hardware), or a server in a cloud computing system. In some implementations, the verification system 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
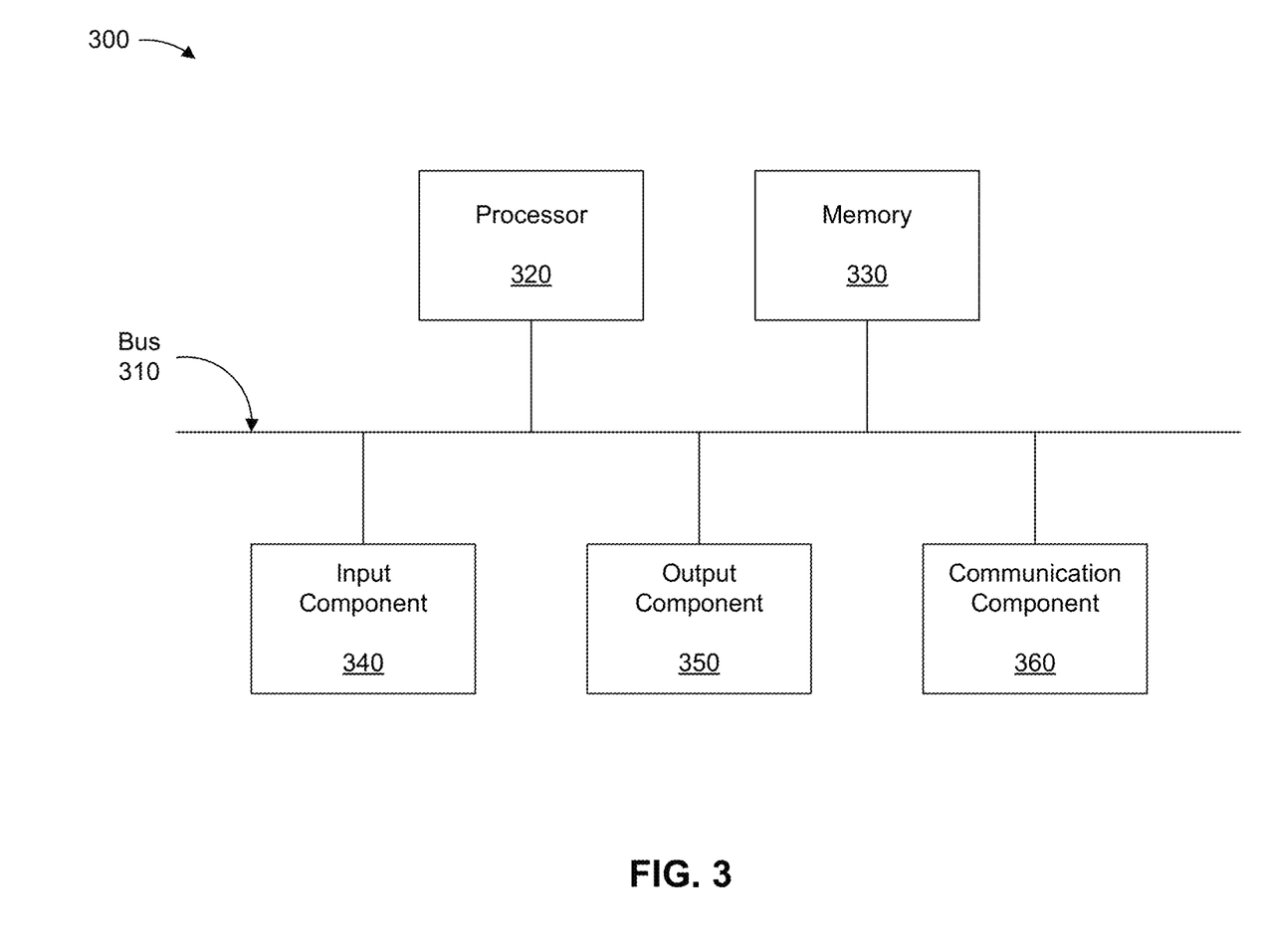
FIG. 3 is a diagram of example components of one or more devices of FIG. 2, in accordance with some embodiments of the present disclosure.

FIG. 3 is a diagram of example components of a device 300 associated with a portable identity verification context with automatic renewal or verification orchestration to mitigate decay, in accordance with some embodiments of the present disclosure. The device 300 may correspond to the user device 210 and/or the verification system 220. In some implementations, the user device 210 and/or the verification system 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
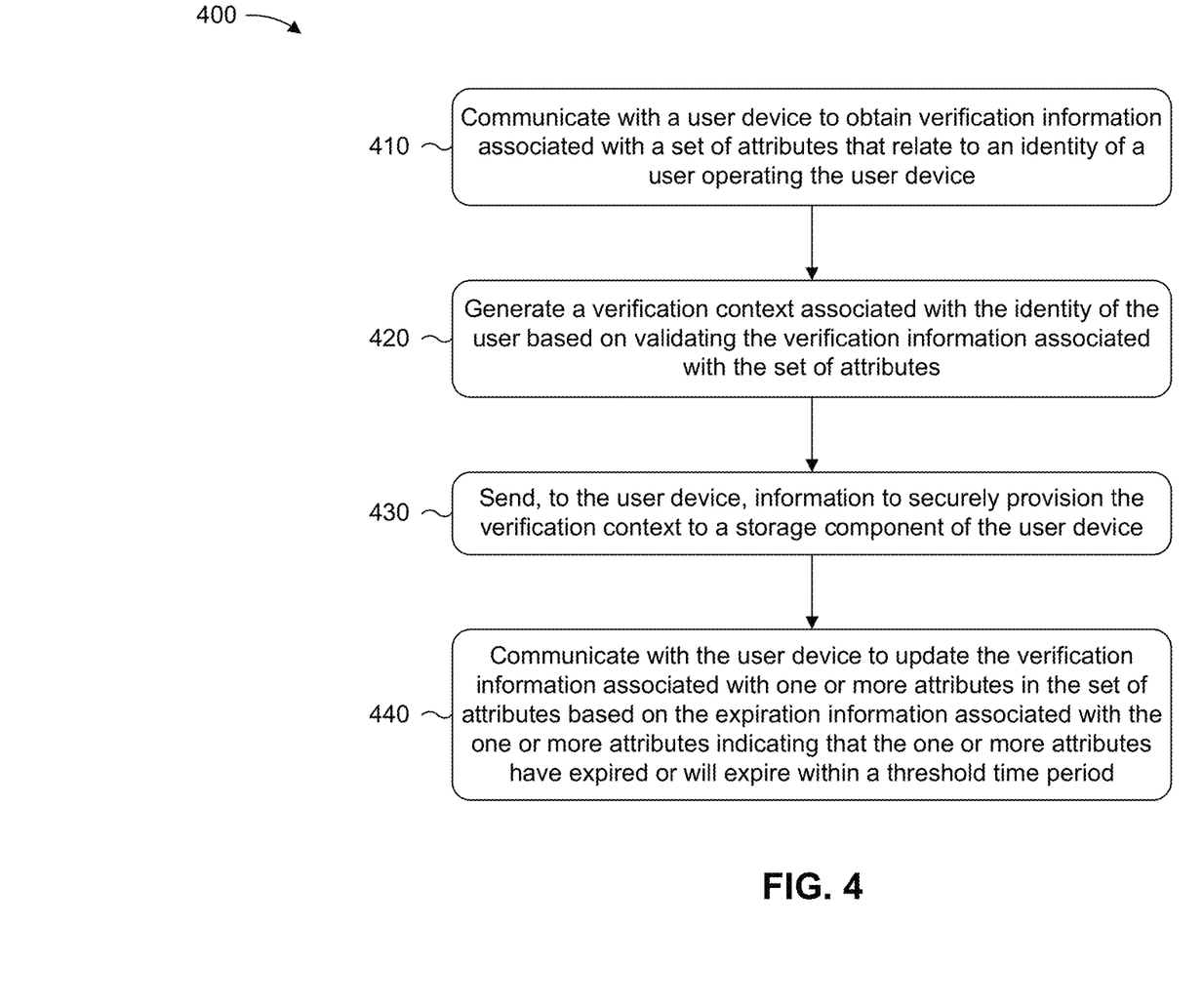
FIG. 4 is a flowchart of an example process associated with a portable identity verification context with automatic renewal or verification orchestration to mitigate decay, in accordance with some embodiments of the present disclosure.

FIG. 4 is a flowchart of an example process 400 associated with a portable identity verification context with automatic renewal or verification orchestration to mitigate decay. In some implementations, one or more process blocks of FIG. 4 may be performed by the verification system 220. In some implementations, one or more process blocks of FIG. 4 may be performed by another device or a group of devices separate from or including the verification system, such as the user device 210. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include communicating with a user device to obtain verification information associated with a set of attributes that relate to an identity of a user operating the user device (block 410). For example, the verification system (e.g., using processor 320 and/or memory 330) may communicate with a user device to obtain verification information associated with a set of attributes that relate to an identity of a user operating the user device, as described above in connection with reference number 110 of FIG. 1A. As an example, the user may provide verification information such as images of one or more identity documents, biometric data such as a fingerprint scan or iris scan, and/or information that relates to possession of a particular user device, which may be used to prove or otherwise verify that the user operating the user device is who they claim to be.

As further shown in FIG. 4, process 400 may include generating a verification context associated with the identity of the user based on validating the verification information associated with the set of attributes (block 420). For example, the verification system (e.g., using processor 320 and/or memory 330) may generate a verification context associated with the identity of the user based on validating the verification information associated with the set of attributes, as described above in connection with reference number 130 of FIG. 1B. As an example, the verification context may include one or more attributes such as a government ID check or another identity document, device possession information, biometric data, telephone number, or the like, which may be included in a verification context associated with the user of the user device based on the verification system validating that the verification information is associated with the identity of the user operating the user device. In some implementations, the verification context includes personally identifiable information associated with the user and a verification status associated with each attribute in the set of attributes that relate to the identity of the user. In some implementations, the verification status associated with each attribute in the set of attributes includes expiration information for the corresponding attribute. As an example, each attribute in the verification context may be associated with a time-to-live, a validity period, an expiration date, or other suitable expiration information, after which the user may be required to reauthenticate the corresponding attribute.

As further shown in FIG. 4, process 400 may include sending, to the user device, information to securely provision the verification context to a storage component of the user device (block 430). For example, the verification system (e.g., using processor 320, memory 330, and/or communication component 360) may send, to the user device, information to securely provision the verification context to a storage component of the user device, as described above in connection with reference number 140 of FIG. 1B. As an example, the information sent to the user device may include a unique identifier or other suitable information related to the verification context, which may be securely stored in a storage component of the user device to be relied upon in one or more access attempts.

As further shown in FIG. 4, process 400 may include communicating with the user device to update the verification information associated with one or more attributes in the set of attributes based on the expiration information associated with the one or more attributes indicating that the one or more attributes have expired or will expire within a threshold time period (block 440). For example, the verification system (e.g., using processor 320 and/or memory 330) may communicate with the user device to update the verification information associated with one or more attributes in the set of attributes based on the expiration information associated with the one or more attributes indicating that the one or more attributes have expired or will expire within a threshold time period, as described above in connection with reference numbers 170 and 180 of FIG. 1C. As an example, when one or more attributes have expired or will expire within a threshold time period, the verification system may communicate with the user device to reauthenticate or revalidate the corresponding verification information such that the verification context may include updated attributes that can be relied upon in one or more subsequent access attempts.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating and maintaining an identity verification context, comprising:
   one or more memories; and
   one or more processors, communicatively coupled to the one or more memories, configured to:
      communicate with a user device to obtain verification information associated with a set of attributes that relate to an identity of a user operating the user device;
      generate a verification context associated with the identity of the user based on validating the verification information associated with the set of attributes,
         wherein the verification context includes personally identifiable information associated with the user and a verification status associated with each attribute in the set of attributes that relate to the identity of the user, and
         wherein the verification status associated with each attribute in the set of attributes includes expiration information for the corresponding attribute;
      send, to the user device, information to securely provision the verification context to a storage component of the user device; and
      communicate with the user device to update the verification information associated with one or more attributes in the set of attributes based on the expiration information associated with the one or more attributes indicating that the one or more attributes have expired or will expire within a threshold time period.

2. The system of claim 1, wherein the one or more processors are further configured to:
   send, to the user device, information to update the verification context provisioned to the storage component of the user device based on the updated verification information associated with the one or more attributes.

3. The system of claim 1, wherein the one or more processors are further configured to communicate with the user device to update the verification information based on a request received from the user device.

4. The system of claim 1, wherein the one or more processors are further configured to communicate with the user device to update the verification information based on a request received from a third party device relying upon the verification context.

5. The system of claim 1, wherein each attribute in the set of attributes is associated with a relative weight based on the expiration information for the corresponding attribute.

6. The system of claim 1, wherein the verification context is encrypted with a unique identifier generated by the system or a device identifier associated with the user device.

7. The system of claim 1, wherein the one or more processors are further configured to:
   receive, from a device associated with an entity relying on the verification context associated with the identity of the user, a request to validate the identity of the user; and
   send, to the device associated with the entity relying on the verification context, information related to one or more attributes in the set of attributes.

8. A method for maintaining an identity verification context, comprising:
   communicating, by a user device, with a verification system to provide verification information associated with a set of attributes that relate to an identity of a user operating the user device;
   receiving, by the user device, a verification context associated with the identity of the user based on the verification system validating the verification information associated with the set of attributes,
      wherein the verification context includes personally identifiable information associated with the user and a verification status associated with each attribute in the set of attributes that relate to the identity of the user, and
      wherein the verification status associated with each attribute in the set of attributes includes expiration information for the corresponding attribute;
   receiving, by the user device, information to securely provision the verification context to a storage component of the user device; and
   communicating, by the user device, with the verification system to update the verification information associated with one or more attributes in the set of attributes based on the expiration information associated with the one or more attributes indicating that the one or more attributes have expired or will expire within a threshold time period.

9. The method of claim 8, further comprising:
   receiving, from the verification system, information to update the verification context based on the updated verification information associated with the one or more attributes.

10. The method of claim 8, wherein the user device communicates with the verification system to update the verification information based on the one or more attributes having expired or expiring within a threshold time period.

11. The method of claim 8, further comprising:
   presenting information associated with the verification context to a third party device that requests information to validate the identity of the user operating the user device,
      wherein the user device communicates with the verification system to update the verification information based on a request that is received from the verification system based on the third party device relying upon the information presented by the user device.

12. The method of claim 8, wherein each attribute in the set of attributes is associated with a relative weight based on the expiration information for the corresponding attribute.

13. The method of claim 8, wherein the verification context is encrypted with a unique identifier generated by the verification system or a device identifier associated with the user device.

14. A non-transitory computer-readable medium storing a set of instructions, the set of instructions comprising:
  one or more instructions that, when executed by one or more processors of a verification system, cause the verification system to:
    communicate with a user device to obtain verification information associated with a set of attributes that relate to an identity of a user operating the user device;
    generate a verification context associated with the identity of the user based on validating the verification information associated with the set of attributes,
      wherein the verification context includes personally identifiable information associated with the user and a verification status associated with each attribute in the set of attributes that relate to the identity of the user, and
      wherein the verification status associated with each attribute in the set of attributes includes expiration information for the corresponding attribute;
    send, to the user device, information to securely provision the verification context to a storage component of the user device; and
    communicate with the user device to update the verification information associated with one or more attributes in the set of attributes based on the expiration information associated with the one or more attributes indicating that the one or more attributes have expired or will expire within a threshold time period.

15. The non-transitory computer-readable medium of claim 14, wherein the one or more instructions further cause the verification system to:
  send, to the user device, information to update the verification context provisioned to the storage component of the user device based on the updated verification information associated with one or more attributes.

16. The non-transitory computer-readable medium of claim 14, wherein the one or more instructions further cause the verification system to communicate with the user device to update the verification information based on a request received from the user device.

17. The non-transitory computer-readable medium of claim 14, wherein the one or more instructions further cause the verification system to communicate with the user device to update the verification information based on a request received from a third party device relying upon the verification context.

18. The non-transitory computer-readable medium of claim 14, wherein each attribute in the set of attributes is associated with a relative weight based on the expiration information for the corresponding attribute.

19. The non-transitory computer-readable medium of claim 14, wherein the verification context is encrypted with a unique identifier generated by the verification system or a device identifier associated with the user device.

20. The non-transitory computer-readable medium of claim 14, wherein the one or more instructions further cause the verification system to:
  receive, from a device associated with an entity relying on the verification context associated with the identity of the user, a request to validate the identity of the user; and
  send, to the device associated with the entity relying on the verification context, information related to one or more attributes in the set of attributes.

* * * * *